United States Patent
Akita et al.

[11] Patent Number: 5,449,739
[45] Date of Patent: Sep. 12, 1995

[54] METHOD OF PRODUCING SHAPED ARTICLE OF AROMATIC HETEROCYCLIC COPOLYMER

[75] Inventors: Hiroshi Akita, Asaki; Hiroto Kobayashi, Tokorozawa, both of Japan

[73] Assignee: Honda Giken Kogyo Kabushiki Kaisha, Tokyo, Japan

[21] Appl. No.: 213,069

[22] Filed: Mar. 15, 1994

[30] Foreign Application Priority Data

Mar. 17, 1993 [JP] Japan ................................. 5-082811

[51] Int. Cl.⁶ ............................................. C08G 69/44
[52] U.S. Cl. .................................... 528/289; 528/290
[58] Field of Search ............................... 528/289, 290

[56] References Cited

U.S. PATENT DOCUMENTS 3,448,080  6/1969  Hirsch ................................. 528/377
5,219,981  6/1993  Gregory et al. ..................... 528/377

FOREIGN PATENT DOCUMENTS 63-256622  10/1988  Japan .

*Primary Examiner*—Nathan M. Nutter
*Assistant Examiner*—John M. Cooney, Jr.
*Attorney, Agent, or Firm*—Birch, Stewart, Kolasch & Birch

[57] ABSTRACT

A shaped article of an aromatic heterocyclic copolymer can be produced by (a) reacting (i) an aromatic diaminodithiol compound, hydrogen atoms of thiol groups of the aromatic diaminodithiol compound being substituted with substituted or unsubstituted alkyl groups, and (ii) an aromatic diamino compound separately with (iii) a dicarboxylic acid derivative in an organic solvent to produce two types of oligomers; (b) reacting the two oligomers in an organic solvent to produce a precopolymer; (c) heating the precopolymer to cause a thiazole ring closure reaction, thereby producing the aromatic heterocyclic copolymer; (d) finely comminuting the aromatic heterocyclic copolymer to obtain fine powder; and (e) molding the powder at an elevated temperature to form an article of a desired shape.

8 Claims, 1 Drawing Sheet

METHOD OF PRODUCING SHAPED ARTICLE OF AROMATIC HETEROCYCLIC COPOLYMER

BACKGROUND OF THE INVENTION

The present invention relates to a method of producing a shaped article of a rigid aromatic heterocyclic copolymer having excellent heat resistance, mechanical properties, chemical resistance, electric properties, etc., as well as high elongation and high bending strength.

It is known that polymers containing heterocyclic repeating units such as thiazole rings, imidazole rings, oxazole rings, oxazinone rings etc., have a high rigidity and excellent mechanical strength, tensile modulus, heat resistance, etc. Therefore, it is expected that these polymers are used as plastic substitutes for metal materials alone or in combination with other engineering plastics.

However, the rigid aromatic polymer such as the aromatic polythiazole generally has a poor solubility in organic solvents, etc. due to its high rigidity, and it is soluble only in limited kinds of strong acids such as methane sulfonic acid, chlorosulfonic acid, etc. Also, it has only poor elongation and flexibility, meaning that it is poor in moldability. Accordingly, it is difficult to mold the rigid aromatic polymer without mixing with other materials.

Also, even in the case of forming a composite material of the rigid aromatic polymer and a matrix polymer, the above problem of poor moldability still remains. Further, since the rigid aromatic polymer does not show a good compatibility with the matrix polymer, it is difficult to blend the rigid aromatic polymer with the matrix polymer at a desired proportion.

To overcome such problems, it is possible to introduce a flexible moiety into the rigid aromatic polymer, thereby improving the moldability of the rigid aromatic polymer. Also, to improve the compatibility of the rigid aromatic polymer with the other polymer, it is possible to introduce a moiety compatible with the other polymer, which has the same structure as or a similar structure to the repeating unit of the other polymer, into the rigid aromatic polymer.

One example of such an attempt is disclosed by Japanese Patent Laid-Open No. 63-256622, which is a method of producing an aromatic heterocyclic copolymer by reacting a particular aromatic oligomer having a thiazole ring with a monomer having a benzene ring provided with at least one carboxyl group and at least one amino group in a polyphosphoric acid. The aromatic heterocyclic block copolymers obtained by this method have rigid molecular chain moieties and soft chain moieties.

However, in the above method, the synthesis of the aromatic heterocyclic copolymer is conducted while being heated in a polyphosphoric acid. Also, when the aromatic heterocyclic copolymer obtained by this method is combined as a reinforcing material with another polymer to provide a molecular composite material, the aromatic heterocyclic copolymer does not show a high compatibility with the matrix polymer because it already has a rigid molecular chain moiety such as a thiazole ring. Therefore, the aromatic heterocyclic copolymer obtained by the method of Japanese Patent Laid-Open No. 63-256622 is not suitable for use in a molecular composite material. Furthermore, Japanese Patent Laid-Open No. 63-256622 does not disclose a method of forming a shaped article of the aromatic heterocyclic copolymer.

OBJECT AND SUMMARY OF THE INVENTION

Accordingly, an object of the present invention is to provide a method of producing a shaped article of an aromatic heterocyclic copolymer having a high rigidity and an excellent mechanical strength.

As a result of intense research in view of the above objects, the inventors have found that such a shaped article can be produced by reacting an aromatic diaminodithiol compound having thiol groups whose hydrogen atoms are substituted by substituted or unsubstituted alkyl groups and an aromatic diamino compound separately with a dicarboxylic acid derivative in an organic solvent to produce two oligomers, reacting the two oligomers to form a precopolymer, heating the precopolymer to cause a ring closure reaction to obtain an aromatic heterocyclic copolymer, finely comminuting the aromatic heterocyclic copolymer, and molding the resultant powder.

Thus, the method of producing a shaped article of an aromatic heterocyclic copolymer according to the present invention comprises the steps of:

(a) reacting (i) an aromatic diaminodithiol compound, hydrogen atoms of thiol groups of the aromatic diaminodithiol compound being substituted with substituted or unsubstituted alkyl groups, and (ii) an aromatic diamino compound separately with (iii) a dicarboxylic acid derivative in an organic solvent to produce two types of oligomers;

(b) reacting the two oligomers in an organic solvent to produce a precopolymer;

(c) heating the precopolymer to cause a thiazole ring closure reaction, thereby producing the aromatic heterocyclic copolymer;

(d) finely comminuting the aromatic heterocyclic copolymer to obtain fine powder; and (e) molding the aromatic heterocyclic copolymer powder at an elevated temperature to form an article of a desired shape.

The precopolymer produced by reacting the two oligomers in the above step (b) is preferably represented by the general formula (1):

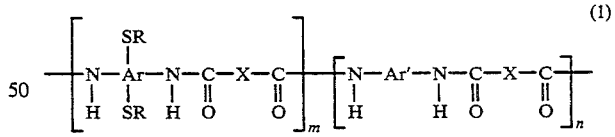

wherein Ar and Ar' are aromatic residues, R is a substituted or unsubstituted alkyl group, X is a residue of the dicarboxylic acid derivative, and "m" and "n" are integers satisfying a ratio (m/n) of 0.01/99.99–99.99/0.01. Also, the aromatic heterocyclic copolymer produced by the thiazole ring closure reaction in the above step (c), is preferably represented by the general formula (2):

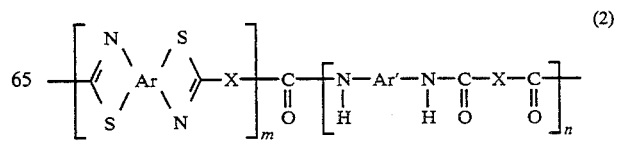

wherein Ar, Ar', X, "m" and "n" are the same as those in the formula (1).

DETAILED DESCRIPTION OF THE INVENTION

Figure 1:
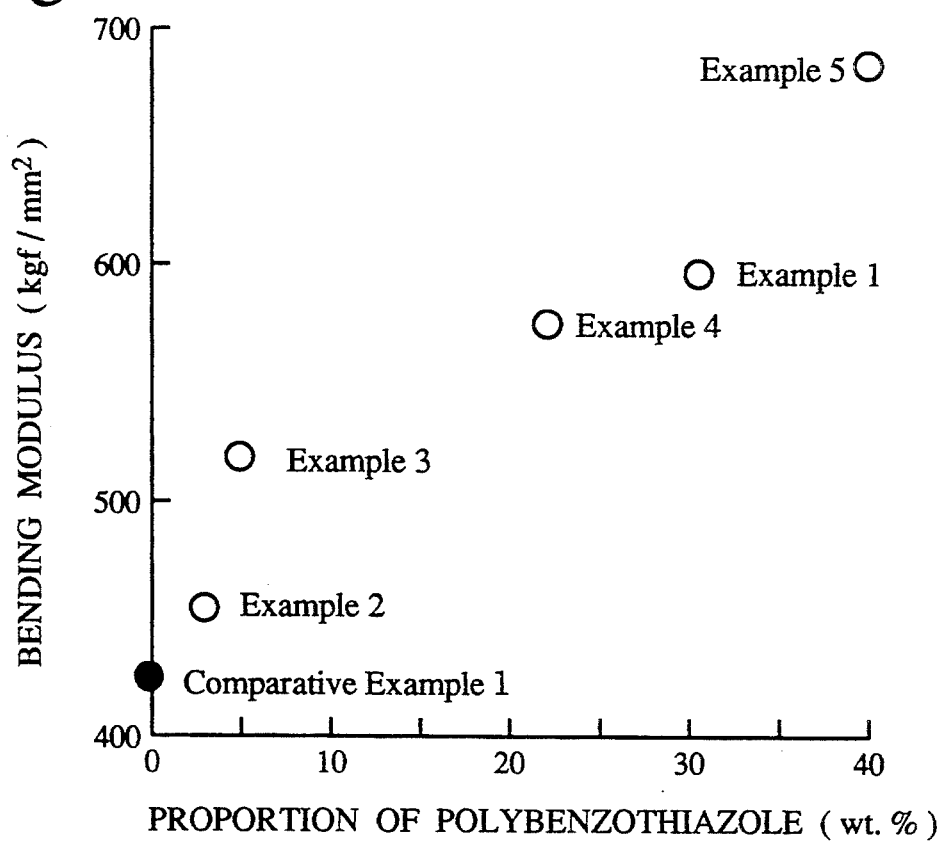
FIG. 1 is a graph showing the relation between the bending modulus of the shaped article and the proportion (weight of a polybenzothiazole moiety in the aromatic heterocyclic copolymer in Examples 1–5 and Comparative Example 1.

The present invention will be explained in detail below.

[A] Aromatic diaminodithiol compound

The aromatic diaminodithiol compound, hydrogen atoms of thiol groups of which compound are substituted with substituted or unsubstituted alkyl groups (hereinafter referred to as "compound A") is represented by the general formula (3):

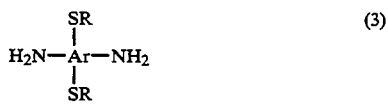

wherein Ar is an aromatic residue, and R is a substituted or unsubstituted alkyl group.

The aromatic residual group Ar may be not only a benzene ring but also any aromatic ring in which 2 or more benzene rings are condensed. Further, the aromatic residual group Ar may be those having 2 or more benzene rings bonded to each other, such as biphenyl. The amino groups and the thiol groups on both sides may be bonded to the aromatic residual group symmetrically with respect to its axis or its central point. Typical examples of such compound A are:

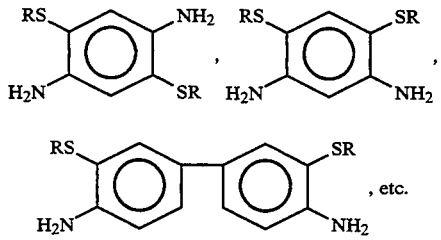

This compound A can be synthesized from an aromatic diaminodithiol compound having amino groups and thiol groups on both sides of the aromatic residue Ar. The starting aromatic diaminodithiol compound may be in the form shown in (3) above, except that each alkyl group R is replaced by a hydrogen atom. This aromatic diaminodithiol compound is used in the form of a salt such as a hydrochloride to prevent its deterioration.

The alkyl groups R bonded to the thiol groups of the aromatic diaminodithiol compound are substituted or unsubstituted alkyl groups. The unsubstituted alkyl groups include an isopropyl group, an ethyl group, an n-propyl group, an n-butyl group, a sec-butyl group, a tert-butyl group, etc. Among them, secondary or tertiary alkyl groups are particularly preferable.

The substituted alkyl groups include alkyl groups substituted with a carboxyl group, an ester group, a cyano group, a benzene group, etc. Incidentally, in the case of having such substituent groups, the alkyl groups need not be secondary ones. The substituted alkyl groups include specifically:

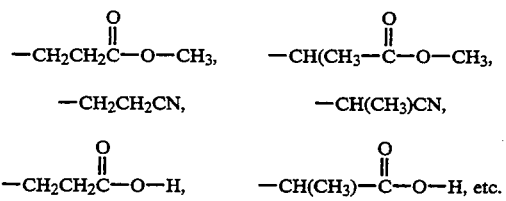

Incidentally, with respect to the first two alkyl groups among the above six substituted alkyl groups, alkyl groups bonded to an oxygen atom in the ester bond need not be a methyl group, and they may be $C_2$–$C_{10}$ alkyl groups.

Particularly when the hydrogen atoms in the thiol groups of the aromatic diaminodithiol compound are substituted with alkyl groups having a cyano group or an ester group, the precopolymer can be easily dissolved in an organic solvent such as N-methyl-2-pyrrolidone, etc., and a ring closure reaction easily takes place at a relatively low temperature.

The above alkyl group bonded to the thiol group of the aromatic diaminodithiol compound may be derived from an alkyl group-containing compound, which may be in the form of a halide, namely an alkyl halide. The halides which may be used in the present invention are bromides, chlorides, iodides, etc. of the above alkyl groups. From such halides and the above aromatic diaminodithiol compound (salts), the compounds A can be produced.

The compound A can be synthesized by the following steps: First, the aromatic diaminodithiol compound salt is reacted with the alkyl halide in an alkaline aqueous solvent. The alkaline aqueous solvent used may be water or a mixture of water and alcohol (for instance, ethanol and/or methanol) in which an alkaline salt such as sodium hydroxide is dissolved. By using an alkaline aqueous solvent, the aromatic diaminodithiol compound salt can be easily dissolved, while increasing a nucleophilic nature of the thiol groups. This accelerates the substitution reaction of hydrogen atoms in the thiol groups with the substituted or unsubstituted alkyl groups. Incidentally, the alkali concentration in the alkaline aqueous solvent is preferably 30 weight % or less.

The substitution reaction can be conducted at a temperature of 0°–100° C. When the substitution temperature is lower than 0° C., the substitution reaction rate is too low. On the other hand, when it exceeds 100° C., a secondary reaction is likely to take place. The preferred reaction temperature is 0—95° C. The reaction time is not specifically restricted, but it is generally about 2–24 hours.

To accelerate the substitution reaction, the solution is preferably stirred. Also, by using an excess amount of an alkyl halide, the reaction rate can be increased. Further, by adding cetyl trimethyl ammonium chloride, n-butyl triphenyl phosphonium bromide, tetraphenyl phosphonium bromide, 18-crown-6, etc. as a phase transfer catalyst, the reaction between the aromatic diaminodithiol compound salt and the alkyl halide can be accelerated.

By conducting the substitution reaction under the above conditions, the hydrogen atoms in the thiol groups of the aromatic diaminodithiol compound salt can be well substituted with the alkyl groups.

In the synthesis of the compound A, the reaction of the aromatic diaminodithiol compound salt and the alkyl halide proceeds as shown by the formula (4). Here, the aromatic diaminodithiol compound salt is exemplified by 2,5-diamino-1,4-benzenethiol dichloride.

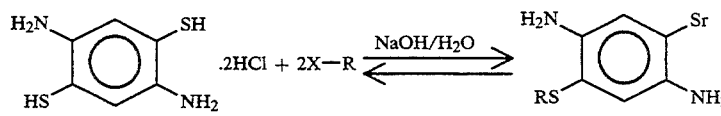

(4)

wherein X-R represents an alkyl halide.

[B] Aromatic diamino compound

The aromatic diamino compound used in the present invention (hereinafter referred to as "compound B") is preferably an aromatic diamino compound having a flexible (bendable) structure unit. Its preferred examples include diamines having aromatic residues such as diphenyl ether, biphenyl, etc. Specific examples thereof are as follows:

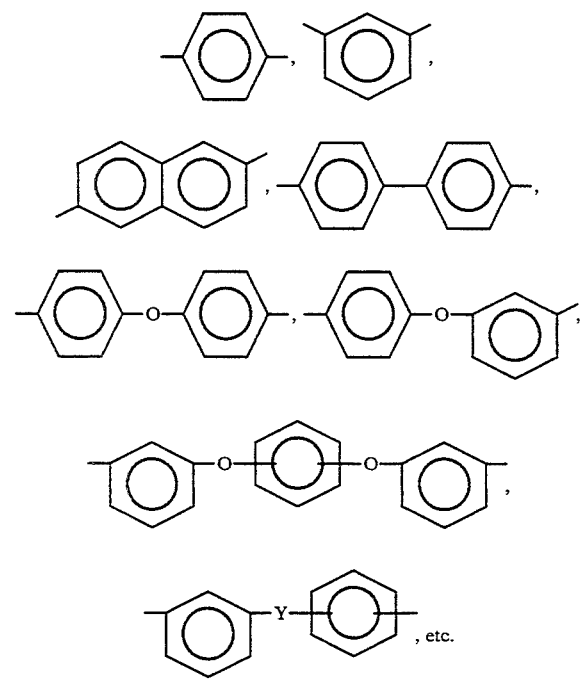

In the above, Y denotes S, $SO_2$, $C(CH_3)_2$, CO and $CH_2$. Among the above aromatic residues, the diphenyl ether groups are preferable. By using such diphenyl ether groups, the resulting aromatic heterocyclic copolymer can be provided with sufficient flexibility.

In a case where the aromatic heterocyclic copolymer is used for a molecular composite material, the aromatic heterocyclic copolymer should have good compatibility with a matrix polymer. In this case, the aromatic diamino compound is selected such that it has the same structure unit as or a similar structure unit to that of the matrix polymer.

[C] Dicarboxylic acid derivatives

The dicarboxylic acid derivatives used in the present invention include those having carboxylic groups substituted with groups shown as follows:

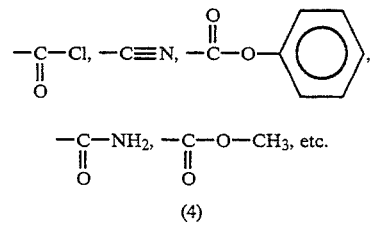

The residual groups of the above dicarboxylic acid derivatives are preferably alkylene groups having relatively short chains (carbon number: 2-10), and aromatic groups as shown below:

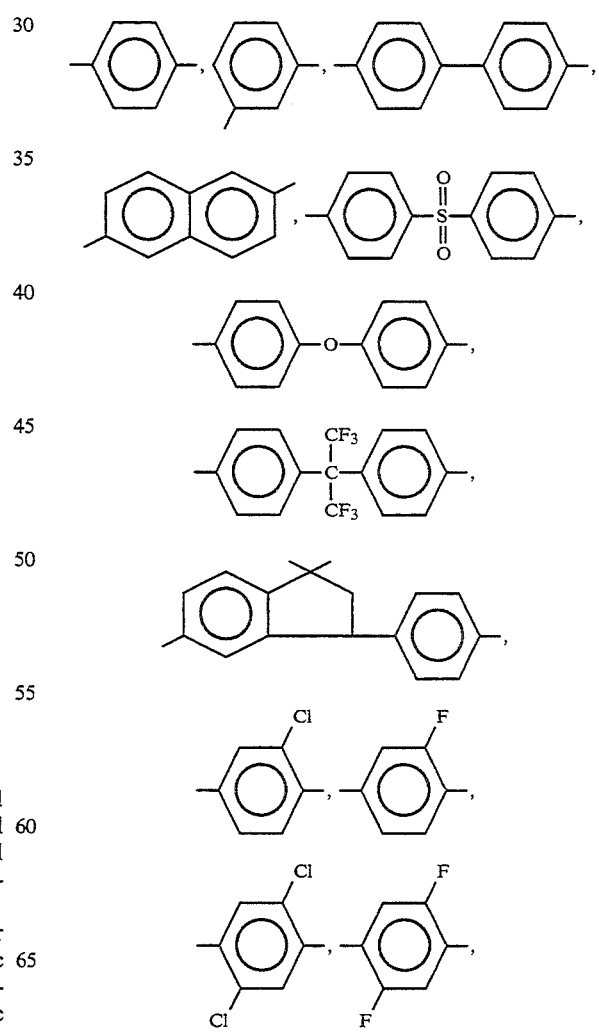

-continued

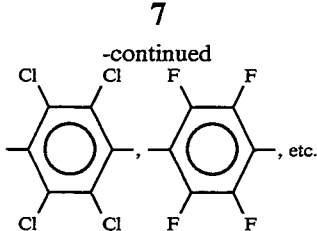, etc.

Among them, aromatic dicarboxylic acid derivatives (hereinafter referred to as "compound C") are preferable, and preferred examples of the aromatic dicarboxylic acid derivatives are derivatives of terephthalic acid, isophthalic acid, etc. Incidentally, the dicarboxylic acid derivatives may be used alone or in combination.

[D] Production of aromatic heterocyclic copolymer (1) Synthesis of oligomers for precopolymer Two types of oligomers are prepared by reacting the aromatic diaminodithiol compound (compound A) and the aromatic diamino compound (compound B) separately with the dicarboxylic acid derivative (compound C). The term "reacting separately" excludes a case where the two types of oligomers are simultaneously produced in a reaction vessel. For instance, (1) the two types of oligomers separately produced in different reaction vessels may be mixed together later, or (2) one oligomer may be produced in a reaction vessel and another oligomer may be subsequently produced in the same vessel. For simplicity of explanation, an oligomer prepared by reacting the compound A with the compound C is identified as "oligomer I," and an oligomer prepared by reacting the compound B with the compound C is identified as "oligomer II."

With respect to the production of the oligomer I, the compound A and the compound C are dissolved in an organic solvent and heated at a desired temperature while stirring.

In the synthesis of the oligomer I, the compound A and the compound C are essentially in equal molar amounts. However, a molar ratio of the compound A to the compound C can be adjusted properly for the reasons below:

(i) To achieve a good reaction between the oligomer I and the oligomer II, it is preferable that one of the oligomer I and the oligomer II has an end group of —COCl, while the other oligomer has an end group of —NH₂.

(ii) The oligomer I should have a proper molecular weight.

The total concentration of the compound A and the compound C is preferably about 0.5–5 mol/liter. When the total concentration is lower than 0.5 mol/liter, reaction efficiency is too low. On the other hand, when it exceeds 5 mol/liter, each component cannot completely be dissolved in an organic solvent.

The organic solvents used in the synthesis of the oligomer I may be preferably amide solvents such as N-methyl-2-pyrrolidone, hexamethyl phosphoric triamide, N,N-dimethyl acetamide, etc., which may be used alone or in combination. To increase the reactivities of components in the organic solvent, chlorides such as LiCl, CaCl₂, etc. may be added to the organic solvent in an amount up to 5 weight %.

The polymerization reaction of the compound A with the compound C may be conducted at a temperature between −20° C. and +200° C. When the temperature is lower than −20° C., sufficient polymerization reaction does not take place. On the other hand, when the temperature becomes about 250° C., a thiazole ring closure reaction is likely to take place. Accordingly, the upper limit of the polymerization temperature is set at 200° C. The preferred polymerization temperature is between −10° C. and +50° C.

Further, in the synthesis of the oligomer I, the solution is preferably stirred to increase the reaction rate. The reaction time is not particularly restricted, but it may generally be about 1–120 minutes.

The polymerization reaction between the compound A and the compound C proceeds as shown by the formula (5) below. Here, the compound A is exemplified by 2,5-diamino-1,4-benzenethiol dichloride substituted with alkyl groups, and the compound C is exemplified by terephthalic acid dichloride. Incidentally, "m" represents the polymerization degree of the oligomer I.

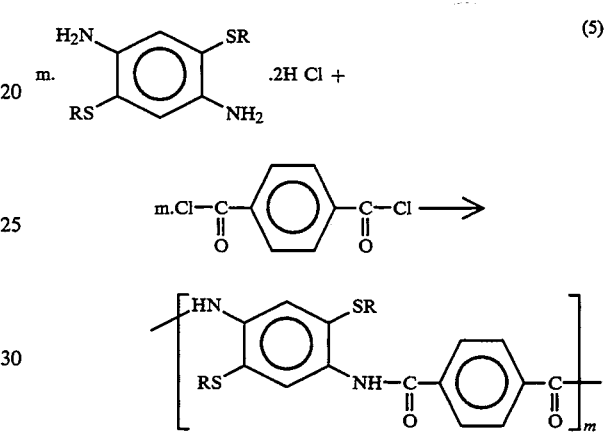

The resulting oligomer I has an intrinsic viscosity $\eta_{inh}$ of about 0.1–1.0 (in N-methyl-2-pyrrolidone at 30° C.).

The oligomer II can be produced from the aromatic diamino compound (compound B) and the dicarboxylic acid derivative (compound C) in the same manner as in the case of the oligomer I. In the synthesis of the oligomer II too, the compound B and the compound C are essentially in equal molar amounts, but a molar ratio of the compound B to the compound C can be adjusted properly for the reasons described below.

The total concentration of the compound B and the compound C is preferably about 0.5–5 mol/liter. When the total concentration is lower than 0.5 mol/liter, reaction efficiency is too low. On the other hand, when it exceeds 5 mol/liter, each component cannot completely be dissolved in an organic solvent.

The polymerization temperature for the oligomer II is between −20° C. and +300° C. When the polymerization temperature is lower than −20° C., sufficient polymerization reaction does not take place. On the other hand, when the polymerization temperature becomes about 400° C., the thermal decomposition of each component is likely to take place. Accordingly, the upper limit of the polymerization temperature is set at 300° C. to prevent such thermal decomposition. The preferred polymerization temperature is between −10° C. and +50° C.

The organic solvents used in the synthesis of the oligomer II may be the same as in the case of the oligomer I.

In the synthesis of the oligomer II, the reaction time is not particularly restricted, but it may generally be about 1–120 minutes.

The polymerization reaction between the compound B and the compound C proceeds as shown by the formula (6) below. Here, the aromatic diamino compound as the compound B is exemplified by 4,4'-diaminodiphenyl ether (4-amino-p-phenoxyaniline), and the dicarboxylic acid derivative as the compound C is exemplified by terephthalic acid dichloride. Incidentally, "n" represents the polymerization degree of the oligomer II.

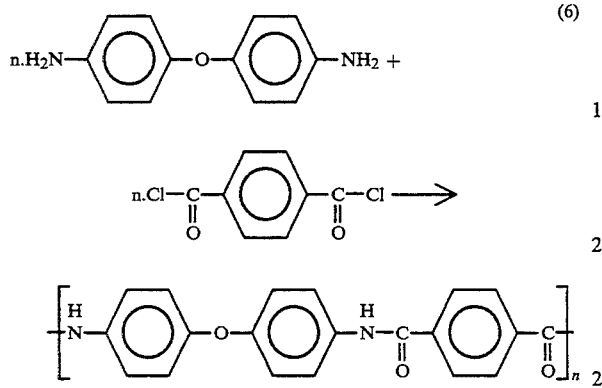

The resulting oligomer II has an intrinsic viscosity $\eta_{inh}$ of about 0.1–1.0 (in N-methyl-2-pyrrolidone at 30° C.).

The amount of the dicarboxylic acid derivative (compound C) used in the syntheses of the oligomers I and II may preferably be adjusted to control the molar ratio of the compound A to the compound C and the molar ratio of the compound B to the compound C.

According to extensive research, the inventors have made the following discovery: When a relatively large amount of the oligomer I is used in the production of the precopolymer for the aromatic heterocyclic copolymer, namely when a relatively large proportion of a rigid moiety having a thiazole ring is introduced into the aromatic heterocyclic copolymer, the molar amount of the compound C should be larger than that of the compound A to some extent in the process of synthesizing the oligomer I. On the other hand, when a smaller amount of the oligomer I is used than the oligomer II in the production of the precopolymer for the aromatic heterocyclic copolymer, the molar amount of the compound C should be slightly smaller than that of the compound A in the process of synthesizing the oligomer I. In this case, it should be noted that when the amount of the compound C is reduced in the production of one oligomer, the amount of the compound C should be increased correspondingly in the production of the other oligomer.

In a specific case where the compound A represented by the following formula (7):

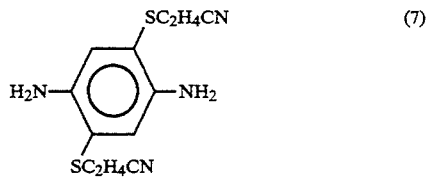

and the compound B represented by the following formula (8):

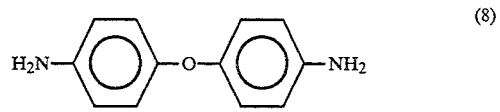

are used to synthesize the oligomers I and II, thereby producing the precopolymer, the amount of the compound C used in the production of the oligomer I is preferably adjusted as shown in Table 1 below, depending on a molar ratio of the oligomer I to the oligomer II. Here, the molar amount of the compound A (formula (7)) is indicated by "a," and the molar amount of the aromatic diamino compound (formula (8)) is indicated by "b."

TABLE 1

| Molar Ratio of Oligomer I to Oligomer II | Amount of Dicarboxylic Acid Derivative* |
|---|---|
| 8:2 | a + 0.1 b |
| 6:4 | a + 0.1 (a + b) |
| 3:7 | a − 0.16 b |
| 2:8 | a − 0.1 (a + b) |

Note
*The amount of the dicarboxylic acid derivative (compound C) used in the production of the oligomer I.

(2) Production of precopolymer

The oligomer I and the oligomer II prepared by the above method are reacted with each other in an organic solvent to synthesize the precopolymer. The organic solvents used in this reaction may be the same as in the case of the oligomers I and II.

Specifically, a solution of the oligomer I in an organic solvent and a solution of the oligomer II in an organic solvent are mixed to synthesize the precopolymer at a temperature between −20° C. and +200° C. while stirring. When the reaction temperature is lower than −20° C., sufficient polymerization reaction does not take place. On the other hand, when the reaction temperature becomes about 250° C., a thiazole ring closure reaction is likely to take place. Accordingly, the upper limit of the reaction temperature is set at 200° C. The preferred reaction temperature is between −10° C. and 50° C.

In case the two types of oligomers I and II are produced in the same vessel, one oligomer may be first produced in the vessel, and raw materials for the other oligomer may be charged into the vessel, thereby causing simultaneous production of the other oligomer and a prepolymer by reacting the two types of oligomers.

By the polymerization reaction of the oligomer I and the oligomer II under the above conditions, the precopolymer for an aromatic heterocyclic copolymer having a large polymerization degree can be obtained without causing a ring closure reaction. The resulting precopolymer has an intrinsic viscosity $\eta_{inh}$ of about 0.5–2.0 (in N-methyl-2-pyrrolidone at 30° C.).

The polymerization reaction of the oligomer I and the oligomer II proceeds as shown by the formula (9) below. Here, the oligomer I is exemplified by that obtained by the formula (5), and the oligomer II is exemplified by that obtained by the formula (6).

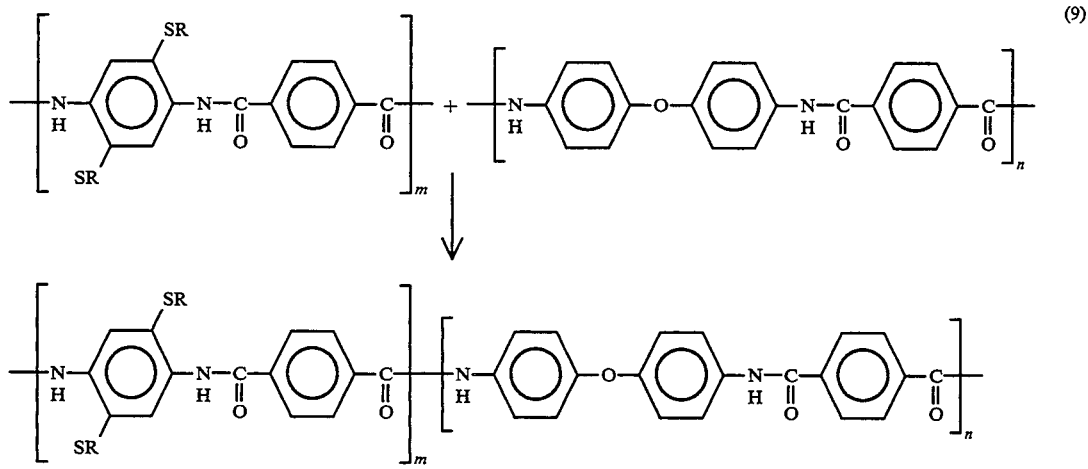

(9)

Incidentally, "m" and "n" represent the polymerization degree of each unit. In the present invention, the concentration ratio (m/n) is generally within the range of 0.01/99.99–99.99/0.01, preferably 40/60–95/5.

The resulting precopolymer for an aromatic heterocyclic copolymer may be washed and dried by a known method. In this case, the precopolymer is preferably formed into powder. One example of the method for forming the precopolymer powder is that the precopolymer dissolved in an organic solvent is dropped into a non-solvent such as deionized water or alcohol by using a tube pump, and the precopolymer is then filtered and dried in vacuum to recover a powdery precopolymer. A grain size of the precopolymer powder thus obtained ranges from 0.001 mm to 0.1 mm.

(3) Ring closure reaction of prepolymer

The ring closure reaction of the precopolymer for an aromatic heterocyclic copolymer may be conducted at 250°–500° C. When the ring closure reaction temperature is lower than 250° C., the thiazole ring cannot be formed. On the other hand, when heated at a temperature exceeding 600° C., the polythiazole is likely to be decomposed. In view of this fact, the upper limit of the ring closure reaction temperature is restricted to 500° C. on the safe side. In the case of using a precopolymer obtained from an alkyl group-substituted aromatic diaminodithiol compound in which the hydrogen atoms of thiol groups are substituted with alkyl groups having a carboxylic group, a cyano group, an ester group, etc., the ring closure reaction can be conducted at such a low temperature as 250°–400° C. Incidentally, this ring closure reaction temperature is about 10°–20° C. lower than that of a polybenzothiazole prepolymer (n=0 in the formula (9)).

By heating the precopolymer, the alkyl group (R) are removed from the precopolymer, thereby forming a thiazole ring at that site. As a result, the aimed aromatic heterocyclic copolymer is obtained.

When the precopolymer obtained by the reaction (9) is used, the aromatic heterocyclic block copolymer having the following structure (10) can be obtained.

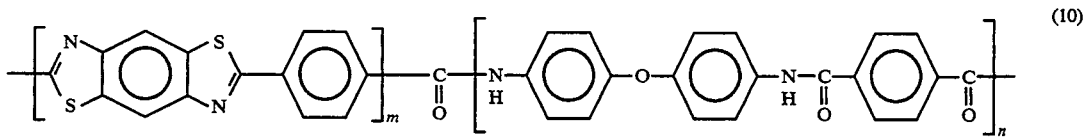

(10)

In the above formula (10), "m" and "n" represent the total numbers of the rigid moiety and the soft (flexible) moiety, respectively. In this aromatic heterocyclic copolymer, the rigid moiety and the soft (flexible) moiety may be arranged as blocks having certain lengths.

The aromatic heterocyclic copolymer produced by the above heat-treatment is further comminuted to form fine powder. The comminuting of the aromatic heterocyclic copolymer may be performed by using a mixer or a homogenizer. To prevent a temperature rise due to heat generation, the comminuting is preferably carried out in a solvent such as ethanol. A preferred average particle size of the aromatic heterocyclic copolymer powder is in the range of 0.001–0.1 mm. The aromatic heterocyclic copolymer powder is formed into an article of a desired shape using a known method. Typical examples of the preferred methods include hot-pressing, injection-molding, etc. The molding is preferably carried out at a temperature of 250°–400° C. and at a pressure of 50–500 kgf/cm$^2$.

The method according to the present invention will be further described in detail by the following examples without intention of restricting the scope of the present invention.

Example 1

(1) Synthesis of oligomer I 8 ml of N-methyl-2-pyrrolidone (hereinafter referred to as "NMP") was poured into a dry 50-ml flask, and 8 mmol (2.2272 g) of a compound A represented by the following formula (7) was then dissolved in NMP to prepare a homogeneous solution in a dry argon stream.

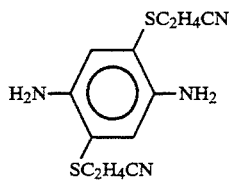

(7)

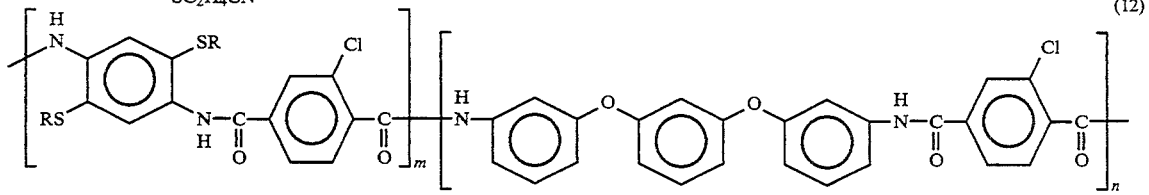

(12)

The solution was cooled in an ice water bath, and 9.6 mmol (2.2798 g) of 2-chloroterephthalic acid dichloride (compound C) was added. The solution was then stirred for 5 minutes to produce an oligomer I.

(2) Synthesis of oligomer II 17 ml of NMP was poured into a dry 50-ml flask, and 12 mmol (3.5082 g) of a compound B represented by the following formula (11) was added to NMP to prepare a homogeneous solution in a dry argon stream.

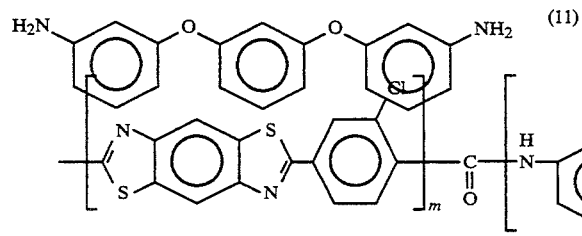

(11)

While cooling in an ice water bath, 10.4 mmol (2.4696 g) of 2-chloroterephthalic acid dichloride was added to the solution, and the solution was then stirred for 5 minutes to produce an oligomer II.

(3) Production of precopolymer

The solution of the oligomer II in NMP thus obtained was added to the oligomer I solution in NMP. After that, the flask containing the oligomer II solution was washed with 2 ml of NMP twice, and the resulting washings were also added to the oligomer I solution.

The mixture solution containing the oligomers I and II was cooled in an ice bath and stirred for one hour. While stirring, the temperature of the solution was allowed to reach a room temperature, at which the solution was maintained for 4 hours while stirring.

By adding NMP to the solution, a concentration of the oligomers I and II (precopolymer) in the solution was adjusted to 2 to 3 weight % and the solution was stirred at 50° C. overnight. The solution was then dropped to 5 liters of deionized water at a rate of 2.5 ml/minute. After stirring overnight, this solution was filtered. A precipitate (polymer) removed from the filtrate was dried at 100° C for 12 hours in vacuum to obtain a precopolymer powder at a yield of 99.9%. The polymer exhibited an intrinsic viscosity $\eta_{inh}$ of 0.75 when measured in NMP at a polymer concentration of 0.5 g/dl at 30° C. by an Ubbelode's viscometer. According to the TG-DTA measurement, it was confirmed that the thiazole rings were formed at 342° C.

It was presumed that the resultant precopolymer had the following formula (12):

In the above precopolymer, "m" is a polymerization degree of the rigid moiety which was derived from the oligomer I and exhibited a rigidity after heat-treatment, and "n" is a polymerization degree of the soft (flexible) moiety derived from the oligomer II. The ratio of m/n was 4:6.

(4) Production of aromatic heterocyclic copolymer powder

The precopolymer powder obtained above was heated at 330° C. for 30 minutes in vacuum to obtain a transparent, brown powder. It was confirmed that removal of the substituted alkyl group from the sulfur atom and the formation of the thiazole rings took place, as shown in the following formula (13).

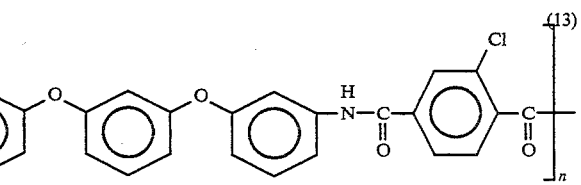

(13)

(4) Production of fine powder of aromatic heterocyclic copolymer

The aromatic heterocyclic copolymer powder thus obtained was finely comminuted in ethanol in a mixer, and dried at 100° C. in vacuum to obtain fine powder of an aromatic heterocyclic copolymer.

(5) Molding of aromatic heterocyclic copolymer

The comminuted powder of the aromatic heterocyclic copolymer was charged into a hot-pressing die and subjected to hot-pressing at 350° C. and at 100 kgf/cm$^2$ to obtain a sheet-like article of 50 mm × 15 mm × 2 mm. The article exhibited a bending modulus of 630 kgf/mm$^2$ and a bending strength of 6.1 kgf/mm$^2$.

Examples 2–5

Example 1 was repeated except that the concentrations of the monomers used were altered so as to obtain four kinds of the aromatic heterocyclic copolymers having different ratios of the polymerization degree "m" of the thiazole-containing rigid moiety derived from the oligomer I to the polymerization degree "n" of the soft (flexible) derived from the oligomer II. The respective ratios (m:n) were 5:95 in Example 2, 7.4:92.6 in Example 3, 3:7 in Example 4, and 5:5 in Example 5. The aromatic heterocyclic copolymers were subjected to hot-pressing in the same manner as in Example 1 to obtain shaped articles. The shaped articles thus obtained were measured with respect to bending modulus in the same manner as in Example 1. The results were shown in FIG. 1 together with those of Example 1.

Example 6

Example 1 was repeated except that 12 mmol (2.5470 g) of the compound B' represented by the following formula (14) was used instead of the compound B to obtain a precopolymer of aromatic heterocyclic copolymer.

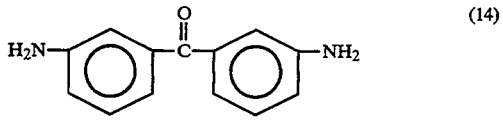
(14)

The yield of the precopolymer was 99.9 %, and the precopolymer had an intrinsic viscosity $\eta_{inh}$ of 0.73 (dl/g). According to the TG-DTA measurement, it was confirmed that the thiazole rings were formed at 323° C.

The precopolymer obtained above was subjected to hot-pressing in the same manner as in Example 1 to obtain a shaped article. The shaped article exhibited a bending modulus of 713.7 kgf/mm² and a bending strength of 6.9 kgf/mm².

Example 7

Example 1 was repeated except that 12 mmol (2.3792 g) of the compound B" represented by the following formula (15) was used instead of the compound B to obtain a precopolymer of aromatic heterocyclic copolymer.

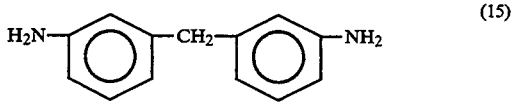
(15)

The yield of the precopolymer was 99.9 %, and the precopolymer had an intrinsic viscosity $\eta_{inh}$ of 0.46 (dl/g). According to the TG-DTA measurement, it was confirmed that the thiazole rings were formed at 323° C.

The precopolymer obtained above was subjected to hot-pressing in the same manner as in Example 1 to obtain a shaped article. The shaped article exhibited a bending modulus of 682.5 kgf/mm² and a bending strength of 7.1 kgf/mm².

Example 8

(1) Synthesis of oligomer I 10 ml of NMP was poured into a dry 50-ml flask, and 8 mmol (2.2272 g) of a compound A represented by the formula (7) was then dissolved in NMP to prepare a homogeneous solution in a dry argon stream.

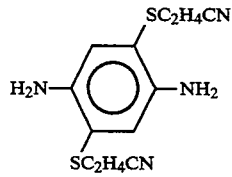
(7)

This solution was cooled in an ice water bath, and 10 mmol (2.3746 g) of 2-chloroterephthalic acid dichloride (compound C) was added. The solution was then stirred for 5 minutes to produce an oligomer I.

(2) Synthesis of oligomer II 10 mmol (2.3746 g) of the compound C was added to the oligomer I-containing solution in the flask while stirring, and 12 mmol (3.5082 g) of the compound B represented by the formula (11) was dissolved in the solution. The compound B was reacted with the compound C for 6 hours to obtain a mixture solution of oligomers I and II.

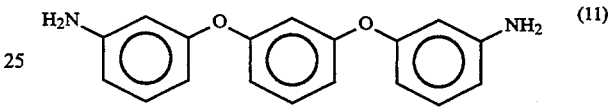
(11)

(3) Production of precopolymer powder

NMP was added to the mixture solution to adjust the oligomer concentration to 2-3 weight %. After stirring at 50° C. overnight, the resultant solution was dropped into 5 liters of deionized water at a rate of 2.5 ml/min. by using a tube pump. After stirring overnight, the solution was filtered. A precipitate recovered from the filtrate was dried at 100° C. for 12 hours in vacuum to obtain a precopolymer powder having the formula (12) at a yield of 99.9%:

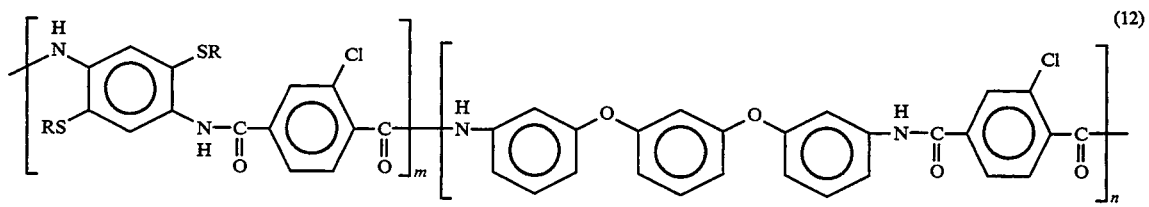
(12)

The precopolymer powder exhibited an intrinsic viscosity $\eta_{inh}$ of 1.00. The TG-DTA measurement revealed that thiazole rings were formed at 320° C. In the prepolymer (12), the ratio of the polymerization degree "m" of the rigid moiety derived from the oligomer I to the polymerization degree "n" of the soft (flexible) moiety derived from the oligomer II was 4:6.

(4) Production of aromatic heterocyclic copolymer powder

The precopolymer powder obtained above was heated at 330° C. for 30 minutes in vacuum to obtain a transparent, brown powder. The powder obtained was finely comminuted in ethanol by using a mixer and dried at 100° C. in vacuum to obtain fine powder of aromatic heterocyclic copolymer.

(5) Molding of aromatic heterocyclic copolymer

The comminuted powder of the aromatic heterocyclic copolymer was charged into a hot-pressing die and subjected to hot pressing at 350° C. and at 100 kgf/cm² to obtain a sheet-like article of 50 mm×15 mm×2 mm.

The article exhibited a bending modulus of 596.4 kgf/mm² and a bending strength of 6.7 kgf/mm²

Comparative Example 1

60 ml of NMP was poured into a dry flask, and 40 mmol (11.6935 g) of a compound B represented by the formula (11) was dissolved in NMP to prepare a homogeneous solution in a dry argon stream.

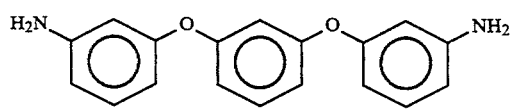

This solution was cooled in an ice water bath, and 40 mmol (9.4988 g) of 2-chloroterephthalic acid dichloride (compound C) was added and reacted with the compound B for 6 hours.

(2) The resultant solution was dropped into a large amount of ethanol at a rate of 2.5 ml/min. by using a tube pump. After stirring overnight, the solution was filtered. A precipitate (polymer) removed from the filtrate was dried in vacuum to obtain polymer powder (aramide polymer) at a yield of 99.9%. The polymer exhibited an intrinsic viscosity $\eta_{inh}$ of 0.55.

The aramide polymer powder thus obtained was charged into a hot-pressing die and subjected to hot-pressing at a temperature of 150° C. and at a pressure of 20 kgf/cm² to obtain a sheet-like article of 50 mm×15 mm×2 mm. The article exhibited a bending modulus of 425 kgf/mm² and a bending strength of 9.6 kgf/mm². The results are also shown in FIG. 1.

Reference Example 1

To investigate a polymerization degree of the rigid moiety derived from the oligomer I in the aromatic heterocyclic block copolymer which is generally difficult to measure, the molecular weight of each oligomer I obtained as an intermediate product was determined by intrinsic viscosity measurement.

Four kinds of oligomers I were prepared in the same manner as in Example 1 except that an amount of the compound C were increased from an equimolar amount relative to the compound A by 5%, 10%, 20% and 30%. The oligomers I thus obtained were measured with respect to an intrinsic viscosity $\eta_{inh}$. In addition, the oligomer I produced at a 30-%-increased molar amount of the compound C was measured with respect to an absolute molecular weight according to the GPC-LALLS method. The results are shown in FIG. 2.

Figure 2:
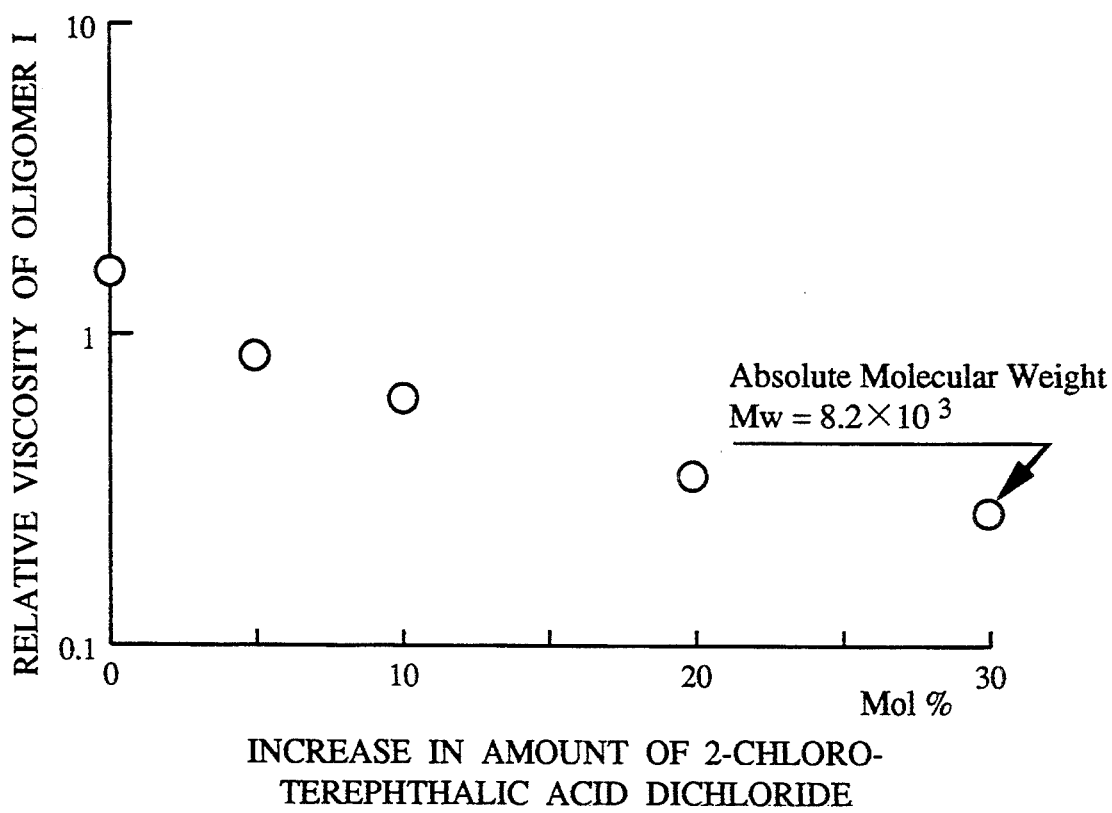
FIG. 2 is a graph showing the relation between the relative viscosity of the oligomer I produced and the increment of the amount (mol %) of 2-chloroterephthalic acid dichloride (compound C) relative to that of the diaminodithiol compound (compound A) in Reference Example 1.

It was confirmed from FIG. 2 that since the molecular weight of the oligomer I was in proportion to the amount of the compound C used, the polymerization degree "m" of the rigid moiety in the aromatic heterocyclic copolymer was controllable by the amount of the compound C.

As described above, in the method of the present invention, two oligomers are synthesized in an organic solvent separately and reacted to form a precopolymer, which is subjected to a ring closure reaction by heating. As a result, the resultant aromatic heterocyclic copolymer may have rigid moieties and soft (flexible) moieties each having a certain length. Accordingly, an article showing not only excellent mechanical strength, heat resistance, solvent resistance, etc. but also good flexibility, elongation and moldability can be produced in any desired shape.

The shaped article of the aromatic heterocyclic copolymer produced according to the present invention can be used as high-strength, high-heat resistance engineering plastic members alone or in combination with other polymers widely for aircraft, automobiles, spacecraft, etc.

What is claimed is:

1. A method of producing a shaped article of an aromatic heterocyclic copolymer comprising the steps of:
   (a) reacting (i) an aromatic diaminodithiol compound, hydrogen atoms of thiol groups of said aromatic diaminodithiol compound being substituted with substituted or unsubstituted alkyl groups, and (ii) an aromatic diamino compound separately with (iii) a dicarboxylic acid derivative in an organic solvent to produce two types of oligomers;
   (b) reacting the two oligomers in an organic solvent to produce a precopolymer;
   (c) heating said precopolymer to cause a thiazole ring closure reaction, thereby producing the aromatic heterocyclic copolymer;
   (d) finely comminuting said aromatic heterocyclic copolymer to obtain fine powder; and
   (e) molding said powder at an elevated temperature to form an article of a desired shape.

2. The method according to claim 1, wherein said precopolymer is represented by the general formula (1):

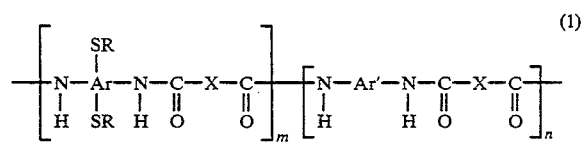

wherein Ar and Ar' are aromatic residues, R is a substituted or unsubstituted alkyl group, X is a residue of said dicarboxylic acid derivative, and "m" and "n" are integers having a ratio (m/n) of 0.01/99.99–99.99/0.01.

3. The method according to claim 3, wherein said aromatic heterocyclic copolymer is represented by the general formula (2):

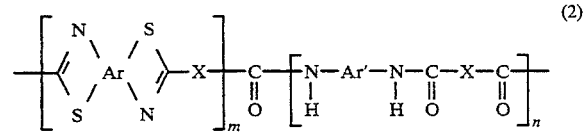

wherein Ar and Ar' are aromatic residues, R is a substituted or unsubstituted alkyl group, X is a residue of said dicarboxylic acid derivative, and "m" and "n" are integers having a ratio (m/n) of 0.01/99.99–99.99/0.01.

4. The method according to claim 2, wherein said aromatic residue Ar' is a diphenyl ether group.

5. The method according to claim 1, wherein said dicarboxylic acid derivative is an aromatic dicarboxylic acid derivative.

6. The method according to claim 5, wherein said aromatic dicarboxylic acid derivative is substituted or unsubstituted terephthalic or isophthalic acid dichloride.

7. The method according to claim 1, wherein said precopolymer in the form of a solution in an organic solvent is dropped into a non-solvent to precipitate said precopolymer, thereby forming precopolymer powder, and wherein said precopolymer powder is heat-treated to produce aromatic heterocyclic copolymer powder which is then finely pulverized.

8. A method of producing a shaped article of an aromatic heterocyclic copolymer comprising the steps of:
(a-1) reacting an aromatic diaminodithiol compound, wherein the hydrogen atoms of the thiol groups of said aromatic diaminodithiol compound are substituted with substituted or unsubstituted alkyl groups, with a dicarboxylic acid derivative in an organic solvent to produce first oligomer;
(a-2) reacting an aromatic diamino compound with a dicarboxylic acid derivative in an organic solvent to produce a second oligomer;
(b) reacting said first and second oligomers in an organic solvent to produce a precopolymer;
(c) heating said precopolymer to cause a thiazole ring closure reaction, thereby producing the aromatic heterocyclic copolymer;
(d) finely comminuting said aromatic heterocyclic copolymer to obtain fine powder; and
(e) molding said powder at an elevated temperature to form an article of a desired shape.

* * * * *